(12) United States Patent
Michel

(10) Patent No.: US 12,447,664 B2
(45) Date of Patent: Oct. 21, 2025

(54) GRIPPER FOR HANDLING HOLLOW BODIES AND MANUFACTURING METHOD

(71) Applicant: SIDEL PARTICIPATIONS, Octeville-sur-Mer (FR)

(72) Inventor: Jocelyn Michel, Octeville-sur-Mer (FR)

(73) Assignee: SIDEL PARTICIPATIONS, Octeville-sur-Mer (FR)

(*) Notice: Subject to any disclaimer, the term of this patent is extended or adjusted under 35 U.S.C. 154(b) by 633 days.

(21) Appl. No.: 17/764,382

(22) PCT Filed: Sep. 30, 2020

(86) PCT No.: PCT/EP2020/077368
§ 371 (c)(1),
(2) Date: Mar. 28, 2022

(87) PCT Pub. No.: WO2021/064021
PCT Pub. Date: Apr. 8, 2021

(65) Prior Publication Data
US 2022/0288838 A1   Sep. 15, 2022

(30) Foreign Application Priority Data

Oct. 3, 2019 (FR) ........................................ 1910943

(51) Int. Cl.
*B29C 49/42* (2006.01)
*B29C 45/14* (2006.01)
(Continued)

(52) U.S. Cl.
CPC .. *B29C 49/42077* (2022.05); *B29C 49/42073* (2022.05); *B33Y 10/00* (2014.12); *B33Y 80/00* (2014.12)

(58) Field of Classification Search
CPC .......... B65G 47/847; B65G 2201/0244; B65G 47/90; B65G 2201/0247; B65G 29/00;
(Continued)

(56) References Cited

U.S. PATENT DOCUMENTS 7,000,756 B2 * 2/2006 Wittmann ............ B65G 47/847
198/470.1
8,002,107 B2 * 8/2011 Balzarin .............. B65G 47/847
198/470.1
(Continued)

FOREIGN PATENT DOCUMENTS

CN   106507658 A   3/2017
DE    3040096 A1   5/1982
(Continued)

OTHER PUBLICATIONS

International search report dated Dec. 18, 2020.

*Primary Examiner* — Eric J Zamora Alvarez
(74) *Attorney, Agent, or Firm* — Blake T. Hudson

(57) ABSTRACT

A branch of a clamp for handling hollow bodies in a plant manufacturing containers made of plastic material, the handling clamp comprising two branches intended to be held by a holding member and being intended to grip a hollow body, the branch comprising a base, and a jaw extending from the base. The base has a front edge intended to be in contact with the hollow bodies. The branch is formed by a metal core extending in the jaw set back from the front edge, and a plastic supplement at least partially covering the metal core, the plastic supplement constituting at least the front edge and being secured to the metal core.

17 Claims, 6 Drawing Sheets

(51) Int. Cl.
*B33Y 10/00* (2015.01)
*B33Y 80/00* (2015.01)
*B65G 47/86* (2006.01)
*B65G 47/90* (2006.01)

(58) Field of Classification Search
CPC .... B65G 47/908; B65G 47/30; B65G 47/904; B25J 15/0028; B25J 15/0038; B25J 15/0475; B25J 13/082; B25J 15/02; B25J 15/0226; B25J 11/0045; B25J 11/008; B25J 15/0033; B25J 15/0042; B25J 15/0061; B25J 15/08; B25J 19/0066; B25J 9/1612; B08B 9/426; B67C 3/242; B29C 49/42073; B29C 49/4205; B29C 49/78; B29C 49/42101; B29C 49/42077; B29C 45/14008; B29C 2045/14049; B29C 2045/1486; B65B 43/46; H05K 13/0404; B33Y 10/00; B33Y 80/00
See application file for complete search history.

(56) References Cited

U.S. PATENT DOCUMENTS

| | | | |
|---|---|---|---|
| 8,439,181 B2* | 5/2013 | Hausladen | B67C 3/242 198/470.1 |
| 8,469,179 B2* | 6/2013 | Balzarin | B67C 3/242 198/474.1 |
| 8,672,376 B1* | 3/2014 | Wilson | B65G 47/847 294/99.1 |
| 9,022,442 B2* | 5/2015 | Rousseau | B29C 49/4205 294/90 |
| 9,193,538 B2* | 11/2015 | Schulnig | B65G 37/00 |
| 9,731,912 B2* | 8/2017 | Fahldieck | B65G 47/846 |
| 11,224,974 B2* | 1/2022 | Groholski | B25J 19/0066 |
| 2003/0136465 A1* | 7/2003 | De Antoni Migliorati | B67C 3/242 141/165 |
| 2010/0282364 A1 | 11/2010 | Balzarin | |
| 2017/0066141 A1 | 3/2017 | Yokoyama et al. | |
| 2020/0191193 A1* | 6/2020 | Schulnig | F16C 11/04 |

FOREIGN PATENT DOCUMENTS

| | | |
|---|---|---|
| EP | 2248759 A1 | 11/2010 |
| JP | 2007084296 A | 4/2007 |
| WO | 03078285 A1 | 9/2003 |
| WO | 2015121031 A1 | 8/2015 |
| WO | 2017184740 A1 | 10/2017 |

* cited by examiner

[Fig. 1]
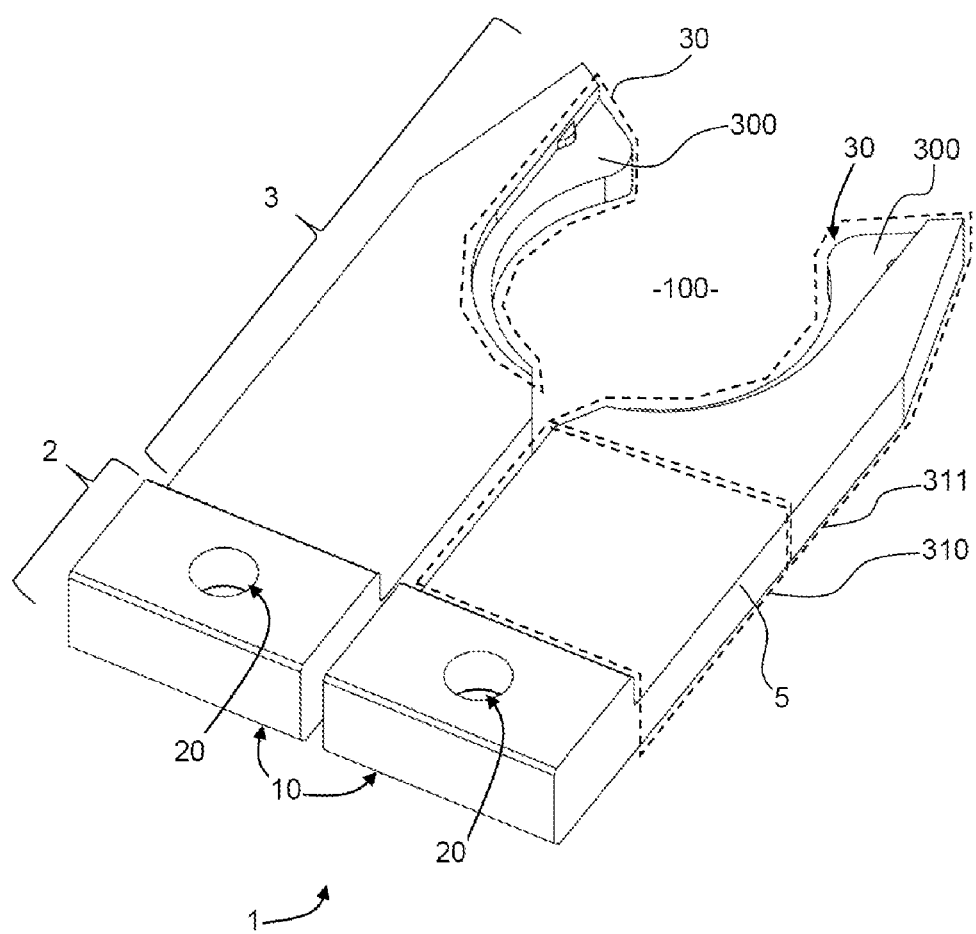

[Fig. 2]
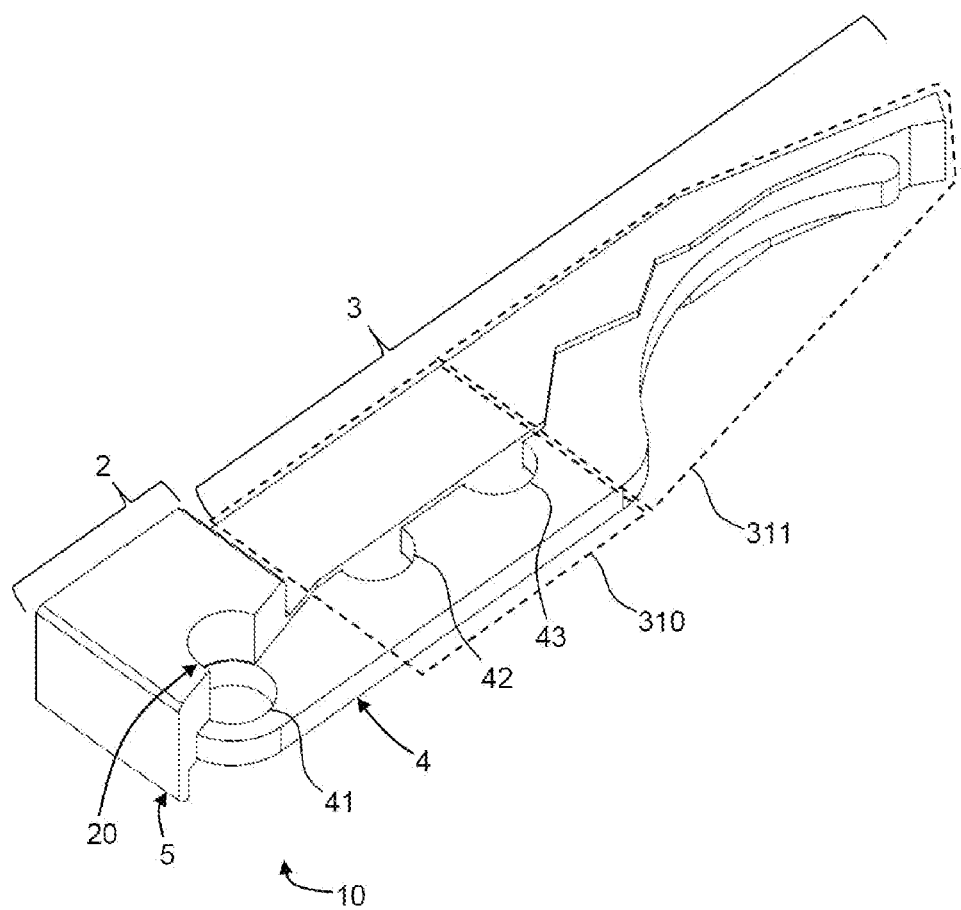

[Fig. 3]
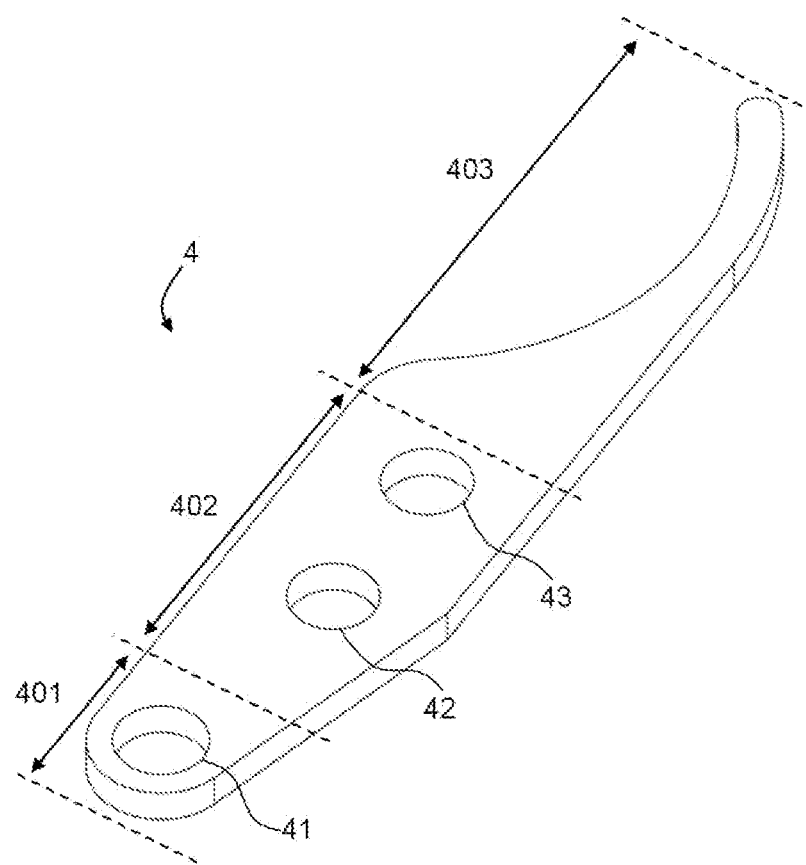

[Fig. 4]
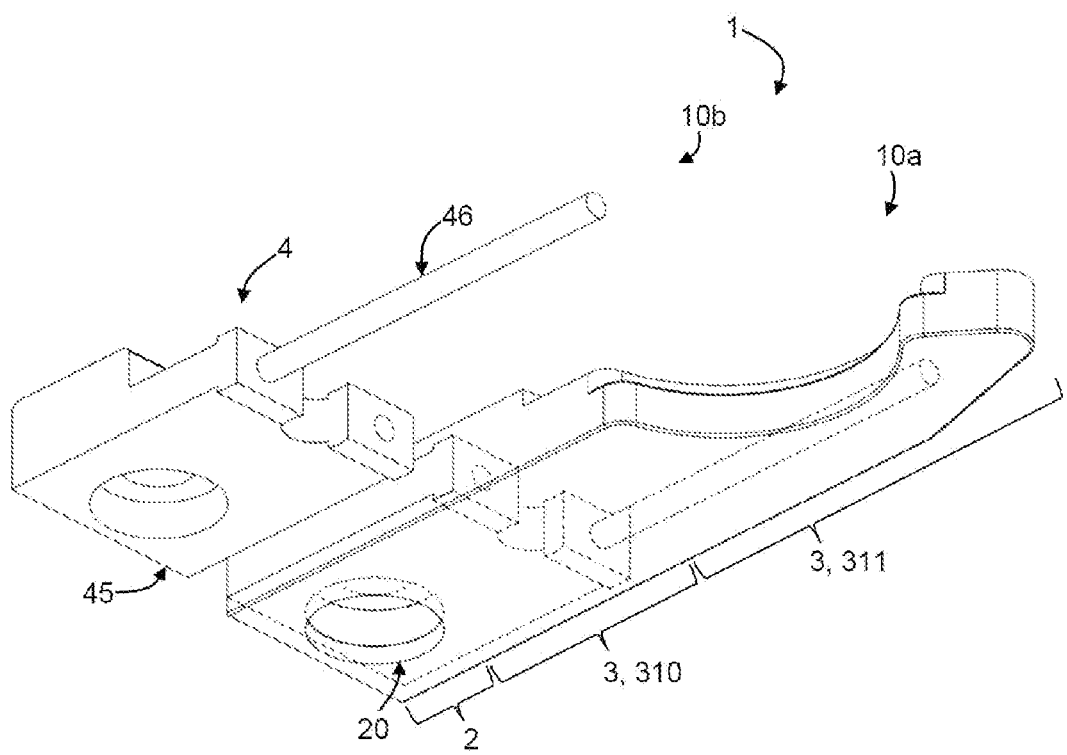

[Fig. 5]
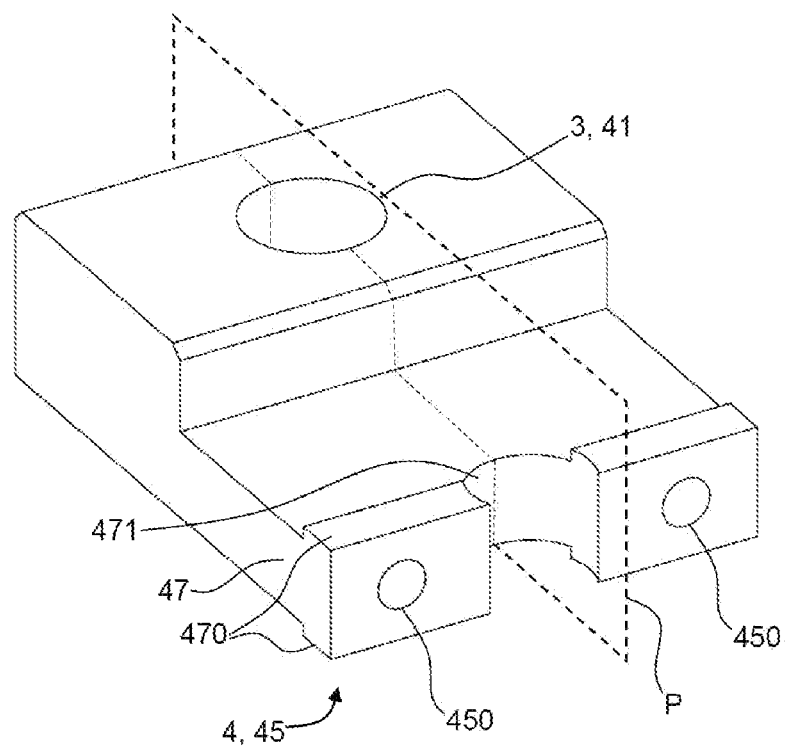

[Fig. 6]
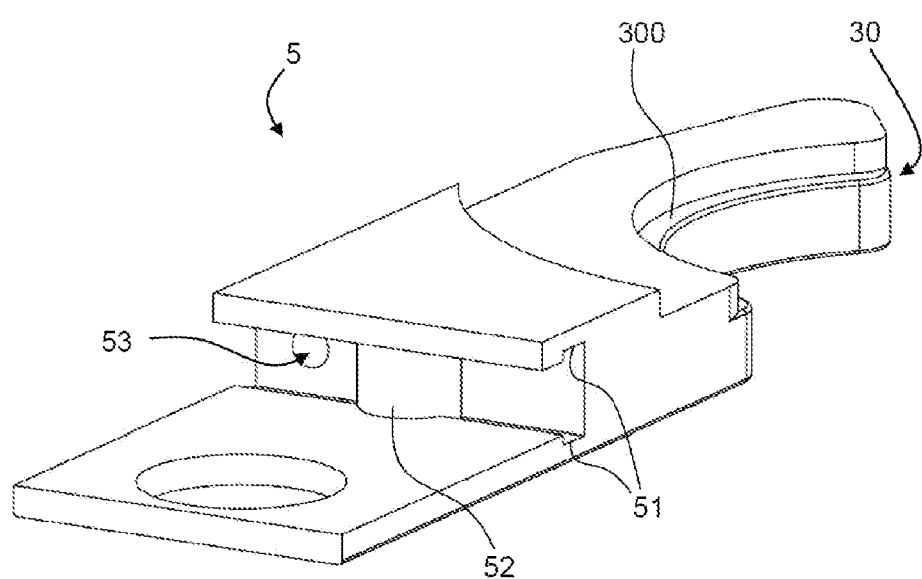

GRIPPER FOR HANDLING HOLLOW BODIES AND MANUFACTURING METHOD

CROSS-REFERENCE TO RELATED APPLICATIONS

This application is a 371 U.S. National Stage Application of PCT Application Serial Number PCT/EP2020/077368 filed on Sep. 30, 2020, which application claims the benefit of and priority to French Application No. FR1910943, filed Oct. 3, 2019, the entire contents of each of which are hereby incorporated herein by reference.

The field of the invention is that of the maintenance of plants manufacturing containers from preforms made of plastic material.

More specifically, the invention relates to the clamps for handling hollow bodies which grip hollow bodies to be conveyed within the manufacturing plant.

To manufacture containers made of plastic material, for example of P.E.T. (acronym for polyethylene terephthalate), preforms are initially heated in a heating unit before being sent to a forming unit. In the forming unit, the preforms are inserted into a mold and a pressurized fluid is then injected into the preforms in order to stretch the plastic material in order to make it fit closely to the walls of the molds and thus form the containers.

Hereinafter in the description, the term hollow body will be employed to denote both a preform and a final container having undergone at least a blow-molding operation or a stretch blow-molding operation.

In the container manufacturing plants, handling clamps convey the preforms, the blanks and the containers from station to station.

These clamps comprise two branches that are independent and, generally, symmetrical with respect to one another.

One branch comprises a base coupled to a holding member, and a jaw extending from the base. The jaw has a front edge intended to enter into contact with the hollow body when the hollow body is inserted into the clamp, removed from the clamp, or gripped by the clamp.

These clamps are metal parts obtained by precision machining. This means that the clamps can have precise characteristics for withstanding the container manufacturing conditions (temperature, rate, forces, etc.).

The precision of their form is also particularly important to avoid having the hollow bodies marked by the front edges of the clamps during transfer. Any marking of the hollow bodies by the clamps is in fact prohibitive to the marketing of the containers which will be manufactured and which will thus exhibit the same marking.

In practice, these clamps are unfortunately brittle. Indeed, it is relatively commonplace for them to break, notably when the preforms or the containers are inserted into the clamps or else when these hollow bodies, held by the handling clamps, are gripped by a handling member and torn away from the clamps.

During this tearing away, a dressing force is created corresponding to a force tearing the hollow body away from the clamp. This dressing can cause a clamp to fold and then break.

These clamps are precision mechanical parts.

The container manufacturers have manufacturing plants that may require more than thirty or so different forms of handling clamps. Consequently, stocks of spare parts are not kept. The breaking of a handling clamp thus results in a period during which the clamp is not replaced, or during which the manufacturing plant must be shut down. The result thereof is lowered production.

Their replacement can also prove costly, and all the more so if the ordering is done piecemeal and with a very short requested delivery lead time.

The situation in which one or more clamps break thus proves problematical because it leads to a lowering of production, even a shut down, and significant costs for this clamp to be rapidly replaced.

The aim of the invention is to mitigate such a situation.

More specifically, the objective of the invention is to propose a solution aiming to mitigate, at least temporarily, the drawbacks relating to the breaking of a clamp for handling hollow bodies in a plant manufacturing containers made of plastic material.

Another objective of the invention is to provide such a solution which makes it possible to rapidly restart the production of the containers at a rate identical to that prior to the breakage.

Yet another objective of the invention is to provide such a solution which does not involve an unreasonable cost overhead to be implemented.

These objectives, and others which will emerge hereinbelow, are achieved by virtue of the invention, the subject of which is a branch of a clamp for handling hollow bodies in a plant manufacturing containers made of plastic material, the handling clamp comprising two branches intended to be held by a holding member and being intended to grip a hollow body, the branch comprising:
- a base having cooperation means intended to cooperate with the holding member to establish a coupling of the branch to the holding member;
- a jaw extending from the base and having a front edge intended to be in contact with the hollow bodies;

wherein the branch is formed by:
- a metal core at least partially constituting the base and the cooperation means, the metal core extending in the jaw set back from the front edge;
- a plastic supplement at least partially covering the metal core, the plastic supplement constituting at least the front edge and being secured to the metal core.

By virtue of the clamp branch according to the invention, a clamp can be repaired, partially or completely, rapidly and without having a cost as high as an emergency order for a clamp obtained by precision mechanical machining.

More specifically, the clamp branch according to the invention has the same form as that which must be repaired.

According to the principle of the invention, the clamp branch has a composite design with the metal core and the covering plastic supplement. This composite design makes it possible to associate:
- a first part formed by a standardized metal reinforcement, readily available and inexpensive, that can therefore be manufactured in quantities to constitute a stock;
- a second part formed from a plastic material, that can be easily and rapidly produced (notably directly at the manufacturing plant), while having a low manufacturing cost.

Such a composite design allows the replacement clamp to withstand the container manufacturing conditions, and notably the high temperatures of the ovens of the manufacturing plants.

Although it does not have a very long life, this composite clamp offers enough time for the operators of the manufacturing plant to procure, at a reasonable cost, metal handling clamps obtained by precision mechanical machining.

By virtue of the replacement clamp according to the invention which can be produced on site rapidly, the absence of a stock of replacement handling clamps does not result in a particularly long production stoppage.

Finally, the front edge made of plastic material has the capacity not to mark the hollow bodies in the manufacturing plant, inasmuch as it is identical to that of a clamp manufactured by precision mechanics, and in which the plastic used has a lesser hardness than that of steel.

The plastic supplement in fact allows the handling clamp branch according to the invention not to damage the hollow bodies.

This plastic material can exhibit a relative brittleness, but this brittleness is compensated by the presence of the metal core.

The clamp branch according to the invention also has the advantage of being able to be easily, and for an inexpensive cost, adapted to replace handling clamps of different gages.

In fact, the metal core can have a standardized design allowing it to be employed for the production of handling clamps that have different pitches (separations). It is then the plastic supplement which is designed differently to adapt to the desired final form of the handling clamp to be replaced.

According to a first embodiment, the metal core comprises:
 a metal block at least partially constituting the base and the cooperation means;
 a metal rod coupled to the metal block and extending from the metal block in the jaw.

The metal block, essentially forming the base of the branch, is a strong element little subject to the strains, unlike the jaw of the clamp branch. It can then be produced by precision mechanical machining and be reusable.

The metal rod, for its part, forms an element that is inexpensive to produce and can easily be replaced when a new clamp branch is manufactured with the reused metal block.

Advantageously, the metal block has two housings, each able to receive the metal rod to couple it to the metal block, the housings being formed on either side of a central axis of the metal block.

By virtue of this design, the metal block can be used interchangeably to produce a right or left clamp branch.

According to a second embodiment, the meta core is a flat metal sheet.

The use of a flat metal sheet proves particularly suitable through the capacity of this material to have the structural strength necessary to the production of the metal core.

Such a flat metal sheet also has a low manufacturing cost.

The flat metal sheet can be machined, laser-cut or even stamped to allow the metal core to be obtained.

It is important to note that this metal core is not necessarily obtained by precision machining. This is all the more advantageous as it is the plastic supplement at least partially covering the metal core which comes into contact with the hollow bodies.

According to a preferred design, the metal core has at least one through-hole formed in its thickness, the plastic supplement having two faces situated on either side of the through-hole and being secured through the through-hole.

In this way, the plastic supplement is secured particularly strongly to the metal core.

The result thereof is that the plastic supplement is stiffened with the metal core and the latter can optimally absorb the forces exerted on the plastic supplement.

Preferentially, the metal core is embedded in the plastic supplement. In this case, the securing of the plastic supplement on the metal core is optimized and the capacity of the metal core to absorb the forces is reinforced.

This design also makes it possible to minimize the quantity of material used to form the metal core. It is then the plastic supplement which forms most of the handling clamp branch according to the invention and which, ultimately, constitutes its form.

Preferentially, the plastic supplement is a one-piece part.

In this way, the strength of this plastic supplement is optimized.

According to another embodiment that can be envisaged, the plastic supplement is produced in at least two parts joined to one another.

According to a preferential embodiment, the plastic supplement is obtained by additive manufacturing in plastic. By virtue of this embodiment, the plastic supplement can be produced rapidly, on demand, and for a low cost.

It is important to note that the plastic supplement can, in this case, be directly produced at the plant manufacturing containers made of plastic material. This capacity proves particularly important for operators of the manufacturing plant needing to be able to rapidly respond to a breakage of a hollow body handling clamp.

This additive manufacturing in plastic to produce the plastic supplement also makes it possible to extremely rapidly adapt the form of the plastic supplement that is sought to be obtained.

Another subject of the invention is a method for manufacturing a hollow body handling clamp branch, as defined previously.

This manufacturing method is characterized in that it comprises:
 a preliminary step of obtaining a metal core;
 a step of securing a plastic supplement on the metal core, the plastic supplement being produced as at least partial covering of the metal core.

In the preliminary step of obtaining of the metal core, this metal core is manufactured or simply purchased.

This method makes it possible to rapidly manufacture a hollow body handling clamp for a plant manufacturing containers made of plastic material which has the capacity to temporarily withstand the stresses of a manufacturing plant while not damaging the hollow bodies which will be inserted into, conveyed in and extracted from the temporary handling clamp.

This manufacturing method is thus particularly suitable for being able to perform a temporary replacement of a handling clamp obtained by precision machining which might be damaged and the rapid replacement of which would be extremely costly or for which failure to replace would result in a lowering of production or an undesirable production stoppage.

Advantageously, the manufacturing method comprises a step of additive manufacturing of the plastic supplement.

The manufacturing method thus offers the capacity to rapidly adapt the form of the plastic supplement and rapidly and inexpensively obtain this plastic supplement.

For example, in less than one hour, the hollow body handling clamp according to the invention can be manufactured.

According to a preferred embodiment, the additive manufacturing step comprises:
 a first substep of printing of an intermediate form of the plastic supplement, the intermediate form having an imprint of the metal core open on a face of the intermediate form;

a second substep of printing of a final form of the plastic supplement from the intermediate form;

the manufacturing method comprising a step of insertion of the metal core in the imprint offered by the intermediate form, the insertion step being interposed between the first printing substep and the second printing substep.

The metal core is then at least partially embedded in the plastic supplement directly in the additive manufacturing step.

This makes it possible to maximize the structural strength of the handling clamp branch according to the invention that is thus obtained.

More specifically, this additive manufacturing step promotes the bonding of the plastic material of the plastic supplement on the metal core.

Preferentially, the metal core is heated prior to the insertion step.

The plastic material then has a better bond on the metal core.

According to an advantageous solution, the metal core is at least partially covered by a printing lacquer prior to the insertion step.

In this case, it has been found that the bond of the plastic material on the metal core is further enhanced, and that the handling clamp branch obtained exhibits a greater finishing quality compared to that obtained by the method without printing lacquer.

Other features and advantages of the invention will emerge more clearly on reading the following description of two preferential embodiments of the invention, given as illustrative and nonlimiting examples, and the attached drawings in which:

FIG. 1 is a top perspective view of a hollow body handling clamp having two branches according to the invention;

FIG. 2 is a top perspective view of a branch comprising a metal core and a plastic supplement covering the metal core, the plastic supplement being represented in partial cross section, according to a first embodiment;

FIG. 3 is a top perspective view of the metal core, according to the first embodiment;

FIG. 4 is a bottom perspective view of a hollow body handling clamp, comprising two branches according to a second embodiment of the invention, one of the branches being without its plastic supplement and the other of the branches having its metal reinforcement visible by transparency through its plastic supplement;

FIG. 5 is a top perspective view of a metal block of the metal reinforcement of the branch according to the second embodiment;

FIG. 6 is a top perspective view of the plastic supplement of the branch according to the second embodiment.

The expression "hollow body" is employed hereinbelow to denote both a preform and a final container having undergone a blow-molding operation or a stretch blow-molding operation.

Referring to FIG. 1, a hollow body handling clamp 1 is represented. Such a handling clamp 1 is used in a plant manufacturing containers made of plastic material comprising the following machines: blowing machine, filling machine, labelling machine, etc.

This handling clamp 1 comprises two branches 10.

These two branches 10 are designed to be held by a holding member (not represented) of the manufacturing plant. Each of the branches 10 to this end comprises cooperation means 20 intended to cooperate with the holding member to establish a coupling of the branch 10 to the holding member.

The branches 10 are intended to grip the hollow bodies by their neck. These two branches 10 jointly delimit a space 100 for receiving hollow bodies when they are gripped.

The hollow bodies are essentially fitted in this receiving space 100.

More specifically, each of the branches 10 is held in position by the holding member and the branches 10 have only a relative mobility with respect to one another to allow the insertion, the conveying and the removal of the hollow bodies.

Referring to FIGS. 1, 2 and 4, each branch 10 comprises:
a base 2;
a jaw 3 which extends from the base 2.

The base 2 has the cooperation means 20 intended to cooperate with the holding means to establish a coupling of the branch 10 to the holding member. These cooperation means take the form of a hole passing through the base 2.

This base 2 has an essentially rectangular parallelepipedal form.

The jaw 3, for its part, has a front edge 30 which is intended to enter into contact with the hollow bodies.

More particularly and with reference to FIGS. 1, 2 and 4, a jaw 3 comprises:
a body 310 extending directly from the base 2;
a head 311 situated at the end of the body 310 opposite the base 2 with respect to the body 310, and which has the front edge 30.

As illustrated by FIGS. 1, 4 and 6, the front edge 30 comprises a setback 300. The necks of the hollow bodies gripped by a handling clamp 1 rest on the setback 300 offered by each of the branches 10 of the handling clamp 1.

The form of the branch 10 of the handling clamp 1 according to the invention is thus identical to that of the branches of the original metal handling clamps.

These original metal handling clamps are produced by precision mechanical machining. When a branch of the original clamp breaks, the branch 10 according to the invention is intended to temporarily replace it.

According to the principle of the invention and referring to FIGS. 1 to 6, the branch 10 is formed by a metal core 4 and a plastic supplement 5.

The metal core 4 at least partially constitutes the base 2 and the cooperation means 20.

Referring to FIGS. 2 and 4, this metal core 4 extends in the jaw 3 set back from the front edge 30. The function of the metal core 4, by extending in the jaw 3, is to stiffen this jaw.

Thus, the end of the metal core 4, in the jaw 3 and more specifically in the head 311 of the jaw 3, has a portion situated set back from and along the front edge 30.

According to the principle of the invention and with reference to FIGS. 1 to 6, the plastic supplement 5:
at least partially covers the metal core 4;
constitutes at least the front edge 30 of the jaw 3.

The expression "the plastic supplement constitutes at least the front edge" is understood to mean that only the plastic supplement forms the front edge 30. The metal core 4 does not form or does not constitute at least a part of this front edge 30. Thus, only the plastic supplement 5 of the branch 10 of the handling clamp 1 according to the invention can enter into contact with a hollow body.

This plastic supplement 5 is secured to the metal core 4.

According to the embodiment illustrated by FIGS. 1 to 3, the plastic supplement 5 totally covers the metal core 4 apart from a first through-hole 41 situated in the base 2.

Referring to FIGS. 1 and 2, the metal core 4 is partially embedded in the plastic supplement 5.

This plastic supplement 5 is notably a single-piece part and is in particular obtained by additive manufacturing in plastic.

In other words, the plastic supplement 5 is produced by three-dimensional printing (3D printing) around the metal core 4.

The plastic supplement 5 has an imprint of the metal core 4 allowing it to accommodate the latter.

The imprint corresponds notably to the outer form of the metal core 4 plus a gap of 0.1 mm.

Referring to FIG. 2, the metal core 4 is flat and is more particularly produced in a flat metal sheet.

The metal core is also more specifically obtained by laser cutting of a flat metal sheet.

This metal core 4 comprises:
- the first through-hole 41 which is intended to contribute to the formation of the cooperation means 20;
- a second through-hole 42;
- a third through-hole 43.

The second hole 42 and the third hole 43 contribute to the securing of the plastic supplement 5 on the metal core 4.

In fact, the plastic supplement 5 has two faces situated on either side of the second hole 42 and the third hole 43, and it is secured through these holes 42, 43.

More specifically, the metal core 4 extends longitudinally with, in succession:
- a first section 401 comprising the first hole 41;
- a second section 402 comprising the second hole 42 and the third hole 43;
- a third section 403.

According to FIGS. 2 and 3, in cooperation with the plastic supplement 5:
- the first section 401 of the metal core 4 contributes to forming the base 2 of the branch 10;
- the second section 402 of the metal core 4 contributes to forming the body 310 of the jaw 3;
- the third section 403 of the metal core 4 contributes to forming the head 311 of the jaw 3.

The third section 403 of the metal core 4 notably has a curved form closely following the form of the front edge 30 formed by the plastic supplement 5.

According to the second embodiment illustrated by FIGS. 4 to 6, the plastic supplement 5 partially covers the metal core 4.

Furthermore, according to this second embodiment, the metal core 4 comprises:
- a metal block 45;
- a metal rod 46 coupled to the metal block 45.

The metal block 45 at least partially constitutes the base and the cooperation means.

The metal rod 46 extends from the metal block 45 in the jaw 3.

The metal block 45 has a first through-hole 41 which is intended to contribute to the formation of the cooperation means 20.

To allow the coupling of the metal rod 46, the metal block 45 has two housings 450 each capable of receiving the metal rod 46.

Referring to FIG. 5, these housings 450 are formed on either side of a central plane P of symmetry of the metal block 45.

As can be seen in FIG. 4, the metal block 45 is designed to be used to manufacture a right branch 10a or a left branch 10b of a hollow body handling clamp 1.

This metal block 45 can be reused if the plastic supplement 5 were to give way.

This metal block 45 can be produced by precision mechanical machining.

To manufacture a right branch 10a or a left branch 10b, the metal rod 46 must be inserted into the appropriate housing 450.

The plastic supplement 5 then totally covers the metal rod 46 and partially covers the metal block 45.

The metal block 45 has a particular relief on its surface intended to be covered by the plastic supplement 5. This particular relief is intended to enhance the securing of the plastic supplement 5 to the metal block 45.

More particularly and as illustrated by FIGS. 4 and 5, the metal block 45 comprises an end 47, from which the plastic supplement 5 extends, that has a T-shaped profile, and a groove 471 at right angles to the T-shaped profile.

In other words, at its end 47 the block 45 has two tabs 470, one of which is situated on a top face of the end 47, and the other of which is situated on a bottom face of the end 47. The groove 471 extends at right angles to the tabs 470 running centrally through them.

Referring to FIG. 6, the plastic supplement 5 has:
- two grooves 51 complementing the form of the tabs 470;
- a bead 52 complementing the form of the groove 471.

Obviously, the plastic supplement 5 also has a hole 53 complementing the form of the metal rod 46.

The branch 10 of the handling clamp 1 is obtained using the manufacturing method according to the invention.

This manufacturing method comprises:
- a prior step of obtaining of a metal core 4;
- a step of securing of a plastic supplement 5 on the metal core 4, the plastic supplement 5 being produced at least partially covering the metal core 4.

For the prior step of obtaining of a metal core 4, either the metal core 4 is manufactured, or it is acquired.

For example, in the case where the metal core 4 comprises a metal block 45 produced by precision mechanical machining, this block 45 can be purchased.

The manufacturing method advantageously comprises a step of additive manufacturing of the plastic supplement 5.

The securing step can take place at the same time as the additive manufacturing step, for example if the plastic supplement 5 is a single-piece part and at least partially embeds the metal core 4.

In this case, the additive manufacturing step comprises, in succession:
- a first substep of printing of an intermediate form of the plastic supplement 5;
- a second substep of printing of a final form of the plastic supplement from the intermediate form.

The additive manufacturing step is advantageously parameterized using a three-dimensional rendering of the original handling clamp which is created by precision mechanical machining. This three-dimensional rendering is reworked by subtracting the volume of the metal core, which must be embedded at least partially, plus a gap of 0.1 mm.

The intermediate form of the plastic supplement 5 has an imprint of the metal core 4 open on a face of the intermediate form.

The manufacturing method then comprises a step of insertion of the metal core 4 in the imprint offered by the intermediate form of the plastic supplement 5.

This insertion step is interposed between the first printing substep and the second printing substep so as to allow the metal core 4 to be at least partially embedded in the plastic supplement 5, and thus allow the metal core 4 and the plastic supplement 5 to be joined.

To enhance the bond of the plastic supplement 5 on the metal core 4, the metal core 4 is heated prior to the insertion step.

For example, if the material used to print the plastic supplement 5 has a heating print platen, then the metal core 4 is deposited on the platen prior to the first printing substep.

Furthermore, the metal core 4 is at least partially covered with a printing lacquer prior to the insertion step.

A printing lacquer corresponds to a product sprayed onto a surface intended to be in contact with the 3D-printed material. This printing lacquer makes it possible to enhance the adhesion (or in other words the "bond") of the material printed on the surface sprayed with the lacquer.

A plant manufacturing containers made of plastic material can incorporate a three-dimensional printer implementing the manufacturing method according to the invention.

Advantageously, the printer comprises an interface for selecting a clamp to be produced and means of connection to a remote server hosting handling clamp plans.

Thus, the manufacturing of a handling clamp is initiated using the selection interface which leads to connection to the remote server and downloading of the plan corresponding to the desired handling clamp.

This remote server can be situated with the designer of the container manufacturing plant, and administered by this designer. Thus, the designer can rapidly make modifications to the various handling clamp plans, for example to correct identified manufacturing defects, all of this being transparent for the end user who only needs to initiate the manufacturing of a handling clamp.

The invention claimed is:

1. A clamp (1) comprising two branches (10) held by a portion thereof for gripping hollow bodies, each branch (10) comprising:
    a base (2) having cooperation means (20) to cooperate with the portion of the clamp;
    a jaw (3) extending from the base (2) and having a front edge (30) in contact with the hollow bodies;
    wherein each branch (10) is formed by:
    a metal core (4) at least partially constituting the cooperation means (20), the metal core (4) extending in the jaw (3) set back from the front edge (30);
    a plastic supplement (5) at least partially covering the metal core (4), the plastic supplement (5) constituting at least the front edge (30) and being secured to the metal core (4); and
    wherein the metal core (4) comprises:
    a metal block (45) at least partially constituting the cooperation means (20);
    a metal rod (46) coupled to the metal block (45) and extending from the metal block (45) into the jaw (3).

2. The clamp (1) as claimed in claim 1, wherein the metal block (45) has two housings (45) each capable of receiving the metal rod (46) for coupling the rod to the metal block (45), the housings (45) being symmetrical relative to one another with respect to a central plane (P) of symmetry of the metal block (45).

3. The clamp (1) as claimed in claim 2, wherein the metal core (4) is embedded in the plastic supplement (5).

4. The clamp (1) as claimed in claim 3, wherein the plastic supplement (5) is a one-piece part.

5. The clamp (1) as claimed in claim 3, wherein the plastic supplement (5) is obtained by additive manufacturing in plastic.

6. The clamp (1) as claimed in claim 1, wherein the metal core (4) is a flat metal sheet.

7. The clamp (1) as claimed in claim 6, wherein the metal core (4) has at least one through-hole (42, 43) formed in a thickness of the core, the plastic supplement (5) having two faces situated on either side of the through-hole (42, 43) and being secured through the through-hole (42, 43).

8. The clamp (1) as claimed in claim 1, wherein the metal core (4) has at least one through-hole (42, 43) formed in a thickness of the core, the plastic supplement (5) having two faces situated on either side of the through-hole (42, 43) and being secured through the through-hole (42, 43).

9. The clamp (1) as claimed in claim 1, wherein the metal core (4) is embedded in the plastic supplement (5).

10. The clamp (1) as claimed in claim 1, wherein the plastic supplement (5) is a one-piece part.

11. The clamp (1) as claimed in claim 1, wherein the plastic supplement (5) is obtained by additive manufacturing in plastic.

12. A method for manufacturing each branch (10) of the clamp (1) for handling hollow bodies as claimed in claim 1, wherein the method comprises:
    obtaining the metal core (4);
    securing the plastic supplement (5) to the metal core (4), the plastic supplement (5) being produced as at least partially covering of the metal core (4).

13. The manufacturing method as claimed in claim 12, further comprising a step of additive manufacturing of the plastic supplement (5).

14. The manufacturing method as claimed in claim 13, wherein the additive manufacturing step comprises:
    a first substep of printing of an intermediate form of the plastic supplement (5), the intermediate form having an imprint of the metal core (4) open on a face of the intermediate form;
    a second substep of printing of a final form of the plastic supplement (5) from the intermediate form; and
    wherein the method further comprises an insertion step of inserting the metal core (4) into the imprint offered by the intermediate form, the insertion step being interposed between the first printing substep and the second printing substep.

15. The manufacturing method as claimed in claim 14, wherein the metal core (4) is heated prior to the insertion step.

16. The manufacturing method as claimed in claim 15, wherein the metal core (4) is at least partially covered by a printing lacquer prior to the insertion step.

17. The manufacturing method as claimed in claim 14, wherein the metal core (4) is at least partially covered by a printing lacquer prior to the insertion step.

* * * * *